(12) United States Patent
Chereau et al.

(10) Patent No.: US 11,296,931 B2
(45) Date of Patent: Apr. 5, 2022

(54) METHOD OF DEPLOYING A NETWORK CONFIGURATION IN A DATACENTER HAVING A POINT OF PRESENCE

(71) Applicant: OVH, Roubaix (FR)

(72) Inventors: Romain Francis Daniel Chereau, Saint-Orens-de-Gameville (FR); Benjamin Andre Jean Guerin, Lannilis (FR); Thibaut Bernard Dominique Havard, Lannilis (FR); Olivier Jacques Henri Bedouet, Malissard (FR)

(73) Assignee: OVH, Roubaix (FR)

( * ) Notice: Subject to any disclaimer, the term of this patent is extended or adjusted under 35 U.S.C. 154(b) by 84 days.

(21) Appl. No.: 16/801,632

(22) Filed: Feb. 26, 2020

(65) Prior Publication Data
US 2020/0280486 A1 Sep. 3, 2020

(30) Foreign Application Priority Data

Feb. 28, 2019 (EP) ..................................... 19315011

(51) Int. Cl.
*H04L 12/24* (2006.01)
*H04L 41/0803* (2022.01)
*G06F 9/54* (2006.01)
*H04L 12/46* (2006.01)
(Continued)

(52) U.S. Cl.
CPC .......... *H04L 41/0803* (2013.01); *G06F 9/547* (2013.01); *H04L 12/4641* (2013.01); *H04L 12/64* (2013.01); *H04L 45/50* (2013.01)

(58) Field of Classification Search
None
See application file for complete search history.

(56) References Cited

U.S. PATENT DOCUMENTS 9,756,121 B2 * 9/2017 Hwang ................. H04L 67/101
10,050,809 B2 8/2018 Sharma et al.
(Continued)

OTHER PUBLICATIONS

European Search Report with regard to the counterpart EP Patent Application No. 19315011.7 completed Jul. 15, 2019.
(Continued)

*Primary Examiner* — Ajit Patel
(74) *Attorney, Agent, or Firm* — BCF LLP

(57) ABSTRACT

A method is devised of deploying a network configuration in a datacenter. The network configuration includes one of more points of interconnection, a point of presence of the datacenter being one of the one or more points of interconnection. Each of the one or more points of interconnection in the network configuration is modeled through objects comprising, for each given point of interconnection, a node object representing the point of interconnection, an interface object hierarchically inferior to the node object and representing a connection to the point of interconnection, an evpnEdge object representing the transport to/from of the point of interconnection in the network, and a layer object hierarchically inferior to the evpnEdge object, and representing the characteristics of the protocol of transport to/from the point of interconnection. The network configuration is set up by a succession of commands on the objects and then pushed to the datacenter.

9 Claims, 18 Drawing Sheets

(51) Int. Cl.
  *H04L 12/64* (2006.01)
  *H04L 45/50* (2022.01)

(56) References Cited

U.S. PATENT DOCUMENTS

| | | | | |
|---|---|---|---|---|
| 10,581,793 | B1* | 3/2020 | Semwal | H04L 12/4641 |
| 2016/0308762 | A1 | 10/2016 | Teng et al. | |
| 2017/0201588 | A1* | 7/2017 | Schmidt | H04L 63/0876 |
| 2018/0176317 | A1* | 6/2018 | Hwang | H04L 41/5087 |
| 2018/0205575 | A1* | 7/2018 | Tian | H04L 69/22 |
| 2018/0375760 | A1* | 12/2018 | Saavedra | H04L 12/4633 |
| 2019/0149358 | A1* | 5/2019 | Sharma | H04L 12/1854 370/254 |
| 2019/0268442 | A1* | 8/2019 | Puniani | G06F 9/54 |
| 2020/0065080 | A1* | 2/2020 | Myneni | G06F 9/547 |
| 2020/0162377 | A1* | 5/2020 | Sarva | H04L 45/586 |
| 2021/0026769 | A1* | 1/2021 | Bhandaru | G06F 9/5016 |

OTHER PUBLICATIONS

Israel et al., "Configuration Management of Large IP Telephony Networks", IEEE, 2000, pp. 435-446.

Noghani et al., "Automating Ethernet VPN Deployment in SDN-based Data Centers", IEEE, Fourth International Conference on Software Defined Systems (SDS), 2017, http://www.diva-portal.org/smash/get/diva2:1155826/FULLTEXT02.pdf, pp. 61-66.

Plug et al., "Using EVPN to minimize ARP traffic in an IXP environment", Research Report, University of Amsterdam, 2014, https://www.os3.nl/_media/2013-2014/courses/rp2/p31_report.pdf, 48 pages.

Sajassi et al., "BGP MPLS-Based Ethernet VPN", No. RFC 7432, 2015, http://www.rfc-editor.org/rfc/pdfrfc/rfc7432.txt.pdf, accessed on Feb. 26, 2020, 56 pages.

Krattiger et al., "Building Data Centers with Vxlan Bgp Evpn: A Cisco NX-OS Perspective", Cisco Press, 2017, https://dl.acm.org/doi/book/10.5555/3154213, 351 pages.

Benet et al., "Policy-based routing and load balancing for EVPN-based data center interconnections", Network Function Virtualization and Software Defined Networks (NFV-SDN), 2017, https://ieeexplore.ieee.org/abstract/document/8169841, 7 pages.

\* cited by examiner

METHOD OF DEPLOYING A NETWORK CONFIGURATION IN A DATACENTER HAVING A POINT OF PRESENCE

CROSS-REFERENCE

The present technology claims priority from European Patent Application no. 19315011.7, filed on Feb. 28, 2019, the disclosure of which is incorporated by reference herein.

TECHNICAL FIELD

The present technology relates to deploying network configurations in particular in a datacenter having a point of presence.

BACKGROUND

Today, connectivity of a customer's network to an infrastructure provider's datacenter is at the core of the cloud-related business. There is a need for efficiently deploying in a datacenter resources that integrate well within an existing customer network. Efficiency in that context points to:
- automation and speed of the deployment;
- ability to handle complex connectivity scenarios; and
- deploying only valid and secure configurations in the point(s) of presence and the datacenter(s).

Various attempts have been made at tackling wholly or in part this quest for efficiency by infrastructure providers. However these attempts have failed to contain the problem in particular as it relates to full automation of a deployment, including:
- pushing Layer 2 configuration to the point(s) of presence and the datacenter(s); and
- managing Layer 3 configuration so as enable complex connectivity and flexible topology.

SUMMARY

The present technology aims at providing a method for deploying a network configuration by creating a model for network configurations involving objects, following a sequence of instantiating steps so as to set up the configuration when applied on the objects, then pushing the network configuration to physical resources.

Various implementations of the present technology provide a method of deploying a network configuration in a datacenter, the network configuration including one of more points of interconnection, a point of presence of the datacenter being one of the one or more points of interconnection, the method comprising the steps of:
- modelling each of the one or more points of interconnection in the network configuration through objects, the objects for a given point of interconnection comprising:
  - a node object representing the given point of interconnection,
  - an interface object being hierarchically inferior to the node object and representing a connection to the given point of interconnection,
  - an evpnEdge object representing the transport to/from of the given point of interconnection in the network, and
  - a layer object being hierarchically inferior to the evpnEdge object, and representing the characteristics of the protocol of transport to/from the given point of interconnection;
- setting up the network configuration by a succession of commands on the objects; and
- pushing the set up network configuration to the datacenter.

In one embodiment of the present technology, the method involves REST API calls applied on the objects as commands.

In one embodiment of the present technology, the pushing step is performed after a number of commands that is less than the total number of commands involved in the succession of commands on the objects.

In one embodiment of the present technology, the layer object is adapted for a Layer 2 protocol to be the protocol of transport.

In one embodiment of the present technology, the layer object is adapted for a Layer 3 protocol to be the protocol of transport.

In one embodiment of the present technology, the protocol of transport is VxLAN.

In one embodiment of the present technology, the protocol of transport is MPLS.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale. Finally, elements that are identical from one drawing to the other bear the same numeral reference across drawings.

DETAILED DESCRIPTION

Figure 1:
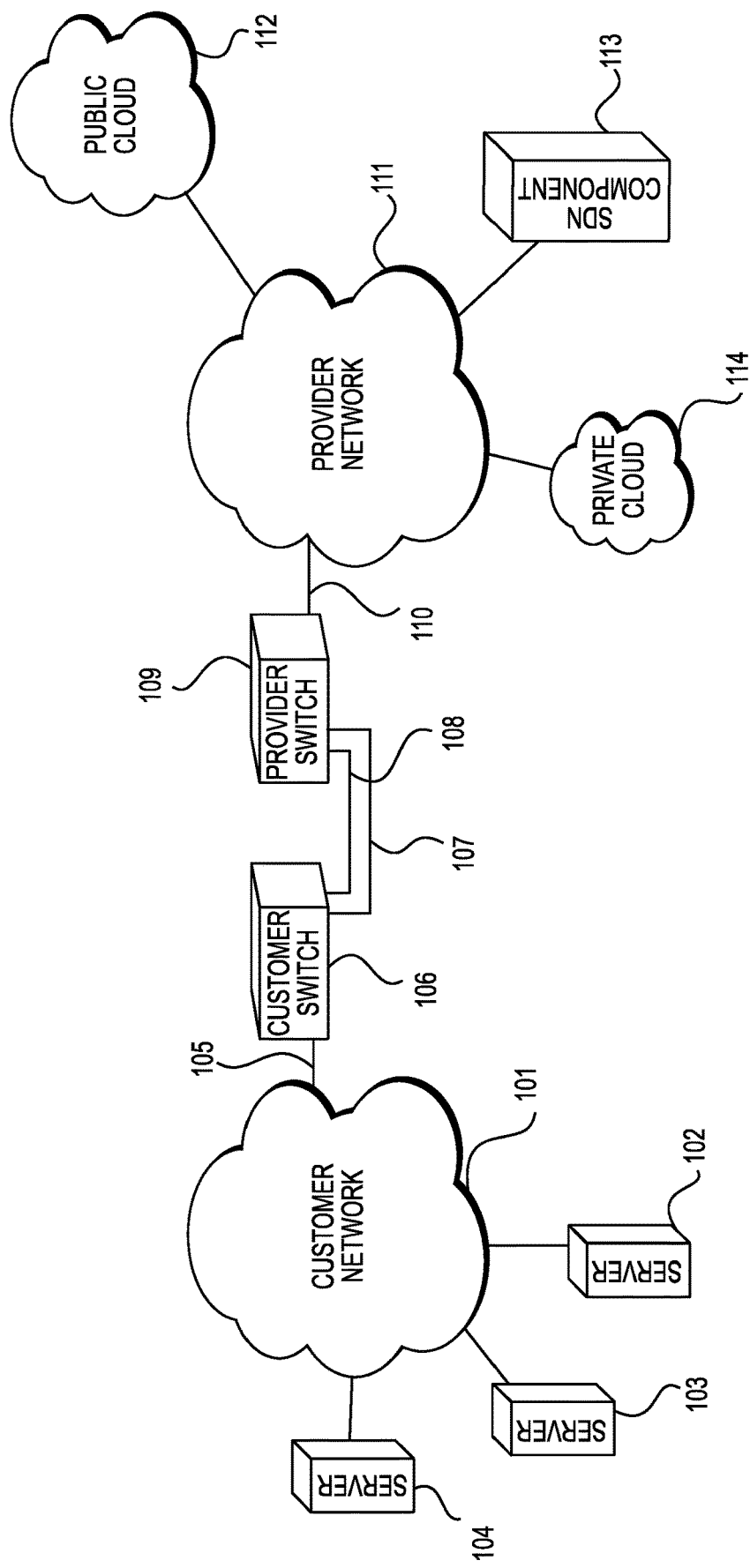
FIG. 1 is an operational view of a first exemplary customer network configuration.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). In the aforementioned, explicit use of the term a «processor» should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that «module» may include for example, but without being limitative, computer program logic, computer program instructions, software, stack, firmware, hardware circuitry or a combination thereof which provides the desired capabilities.

With these fundamentals in place, we will now consider some non-limiting examples to illustrate various implementations of aspects of the present technology.

FIG. 1 is an operational view of a first exemplary customer network configuration. A customer operates a customer network 101, to which are interconnected merely as illustration, machines such as servers 102, 103, 104. Customer network 101 is connected through link 105 to a customer switch 106. Two physical connections 107 and 108, connect customer switch 106 to provider switch 109, and are configured by the customer in aggregate mode, for example using Link Aggregation Control Protocol (LACP). Provider switch 109 constitutes a Point Of Presence (POP) for, and connects to, provider network 111 through link 110. Provider network 111 is operated by an infrastructure provider, and could for example be a virtual resource dedicated to the customer, and for example reside in a provider's datacenter. Merely as illustration, several components could be connected to provider network 111, such as a private cloud 114, a public cloud 112 or a Software Defined Networking (SDN) component 113, so as to facilitate network management for provider network 111.

Figure 2:
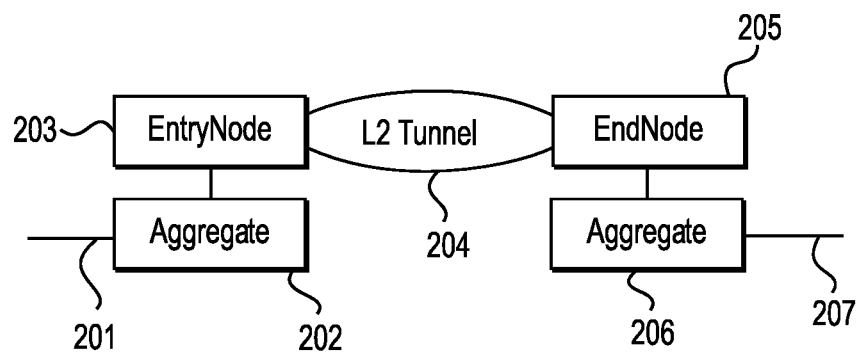
FIG. 2 is a high level model for the first exemplary customer network configuration.

Connectivity at Layer 2 level between customer network 101 and provider network 111 according to FIG. 1 may be represented using a high level model of the provider network and POP's configuration such as shown FIG. 2.

Customer connection 201 enters, through an Aggregate class 202, an EntryNode 203 for provider network 111 (physically: the provider switch 109). An EndNode 205 in provider network 111 is connected to EntryNode 203 through a Layer 2 tunnel 204. Through an Aggregate class 206, connection 207 is given to the customer's dedicated virtual resource in provider network 111.

Figure 3:
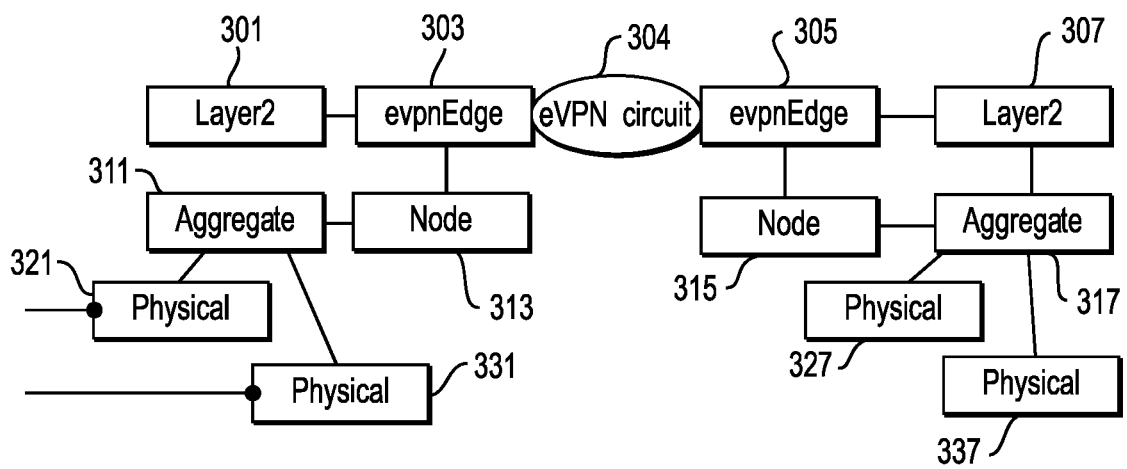
FIG. 3 illustrates the model objects and classes applied to the first exemplary customer network configuration.

Connectivity at Layer 2 level between customer network 101 and provider network 111 through the POP according to FIG. 1 and FIG. 2 is automatically provided by the deployment of a configuration according to FIG. 3. Implementation of the configuration is divided into objects and classes, with each object or class being associated with an implementation action. Each of EntryNode 203 and EndNode 205 is instantiated as the association of respectively evpnEdge objects 303 and 305, with respectively Node objects 313 and 315. Connection to customer's dedicated virtual resource 207 is instantiated as the association of Layer 2 object 307, with Aggregate class 317, and Physical classes 327 and 337. Customer connection 201 is instantiated as the association of Layer 2 object 301, with Aggregate class 311, and Physical classes 321 and 331. L2 tunnel 204 is instantiated as an evpn circuit object 304.

Objects and classes have thus been defined to cover all information useful to deploy a configuration, and for a Representational State Transfer (REST) Application Programming Interface (API) to provide calls necessary to cover all networking situations.

Figure 4:
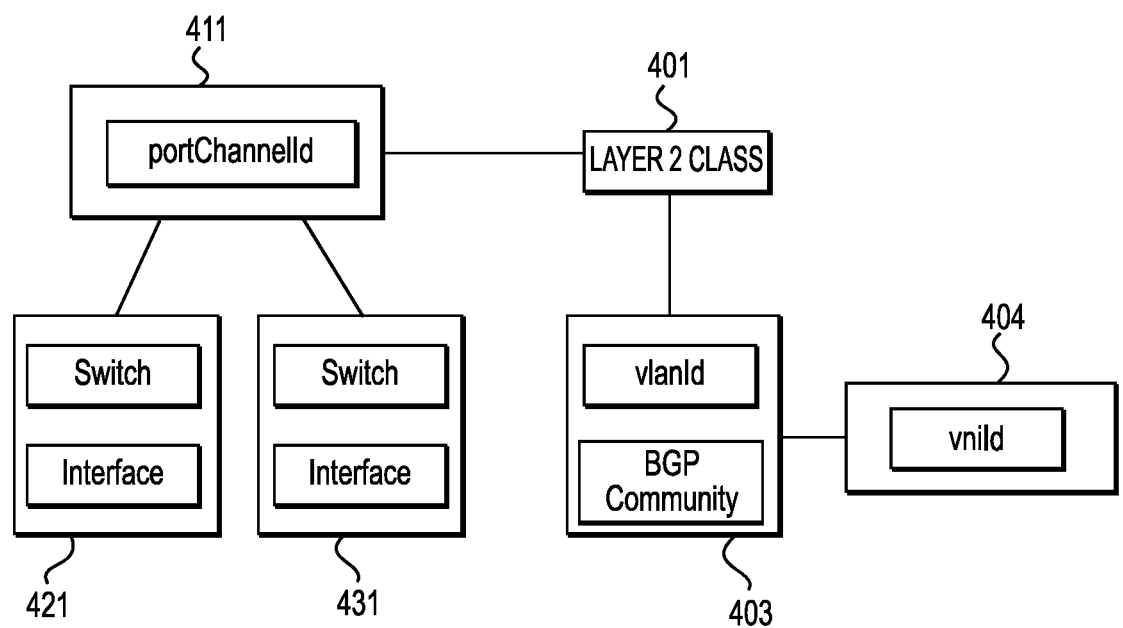
FIG. 4 illustrates the classes as applied to the customer connection.

FIG. 4 illustrates the classes as applied to the customer connection 201. Physical classes 421 and 431 provide information regarding respectively switch and interface. Aggregate class 411 provides information regarding portChannelId. Class 401 is a Layer2 class. EvpnEdge Class 403 provides information regarding vlanId and the BGP Community. EvpnEdge class 404 provides information regarding vniId.

Figure 5:
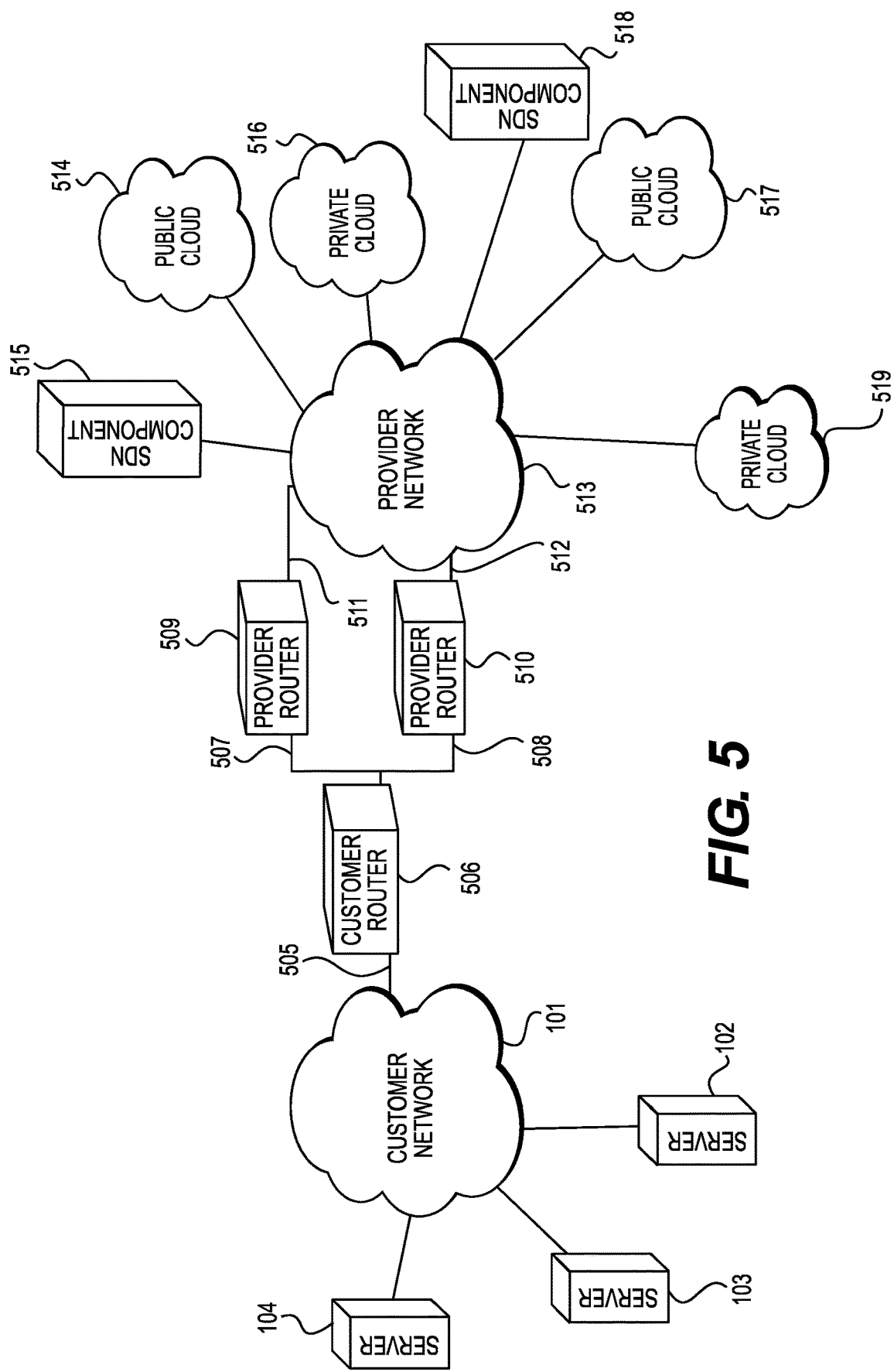
FIG. 5 is an operational view of a second exemplary customer network configuration.

FIG. 5 is an operational view of a second exemplary customer network configuration.

A customer operates a customer network 101, as in FIG. 1. Customer network 101 is connected through link 505 to a customer router 506. Two connections 507 and 508 connect customer router 506 to respectively provider routers 509 and 510. On each connection a Border Gateway Protocol (BGP) session is established. Provider routers 509 and 510 both constitute a POP for, and connect to, provider network 513 through links 511 and 512. Provider network 513 is operated by an infrastructure provider. Merely as illustration, several components could be connected to provider network 513, providing virtual dedicated resources to the customer, such as a private cloud 516, a public cloud 514 or a SDN component 515, for example physically residing in a first datacenter of the provider, and a private cloud 519, a public cloud 517 or a SDN component 518, for example physically residing in a second datacenter of the provider.

Figure 6:
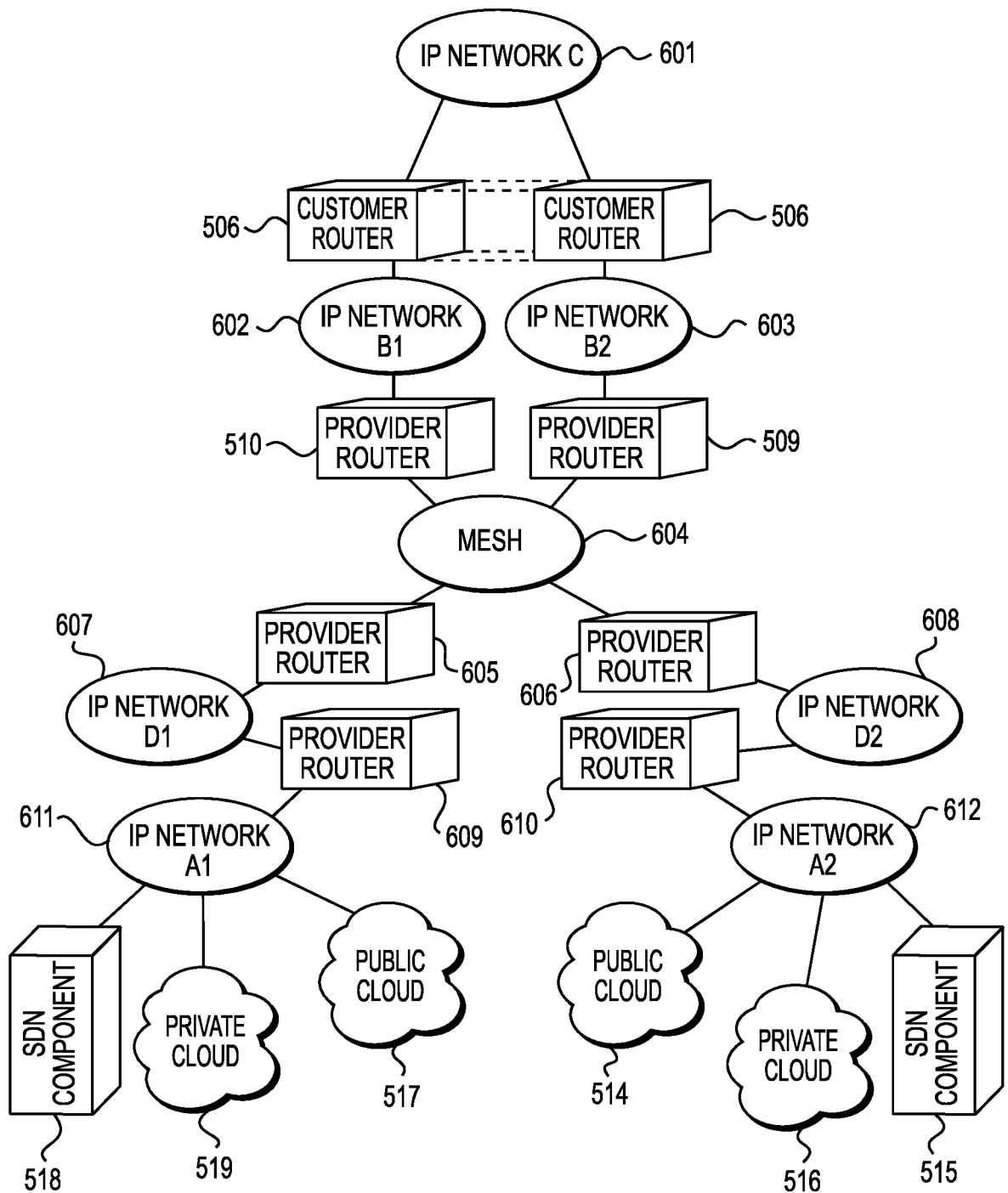
FIG. 6 is a logical view of the second exemplary customer network configuration.

FIG. 6 is a logical view of the second exemplary customer network configuration. Customer operates an IP Network C 601, for example over customer network 101.

Customer router 506 is connected to IP Network C 601 through two Layer 3 connections. Each such connection is routed by customer router 506 to respectively IP Network B1 602 and IP Network B2 603.

Provider router 510 is BGP peered with customer router 506, and connects IP Network B1 602 to a Mesh 604. Provider router 509 is BGP peered with customer router 506, and connects IP Network B2 603 to the Mesh 604. Provider routers 509 and 510 may be considered POPs for the provider network 513.

The Mesh is also connected to provider routers 605 and 606.

Provider router 605 may be connected to IP Network D1 607 through a Layer 3 connection.

A provider router 609 may also be connected to IP Network D1 607, be BGP peered with provider router 605, and be connecting IP Network D1 607 to IP Network A1 611. To IP Network A1 611 may then be connected private cloud 519, public cloud 517 and SDN component 518.

Provider router 606 may be connected to IP Network D2 608 through a Layer 3 connection.

A provider router 610 may also be connected to IP Network D2 608, be BGP peered with provider router 606, and be connecting IP Network D2 608 to IP Network A2 612. To IP Network A2 612 may then be connected private cloud 516, public cloud 514 and SDN component 515.

Figure 7:
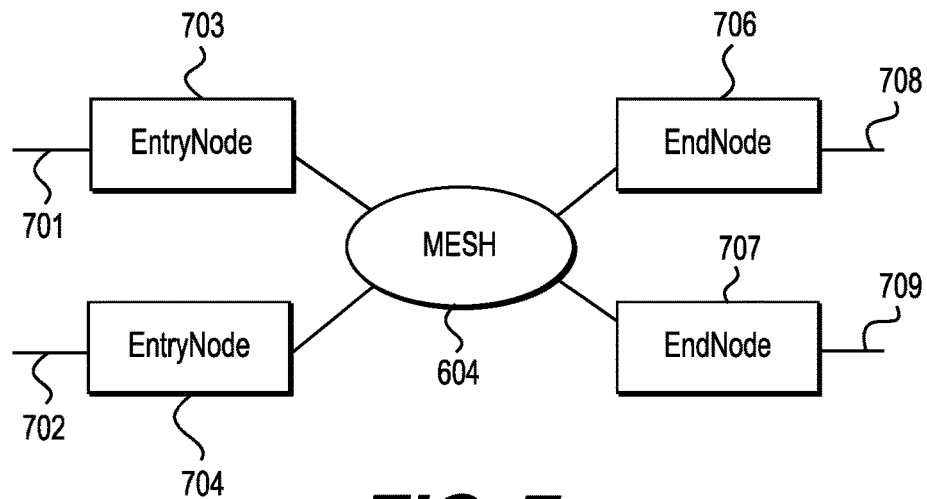
FIG. 7 is a high level model for the second exemplary customer network configuration.

Connectivity at Layer 3 level between customer network 101 and provider network 513 according to FIG. 5 may be represented using a high level model of the configuration for provider network 513's and associated POPs, such as shown FIG. 7.

Customer connection 701 enters an EntryNode 703 for provider network 513 (physically: the provider router 509 or POP). Customer connection 702 enters an EntryNode 704 for provider network 513 (physically: the provider router 510 or other POP).

EndNodes 706 and 707 in provider network 513 are connected in the Layer 3 domain to EntryNodes 703 and 704 through the Mesh 604. Connections 708 and 709 give access to the customer's dedicated virtual resource in provider network 513.

Figure 8:
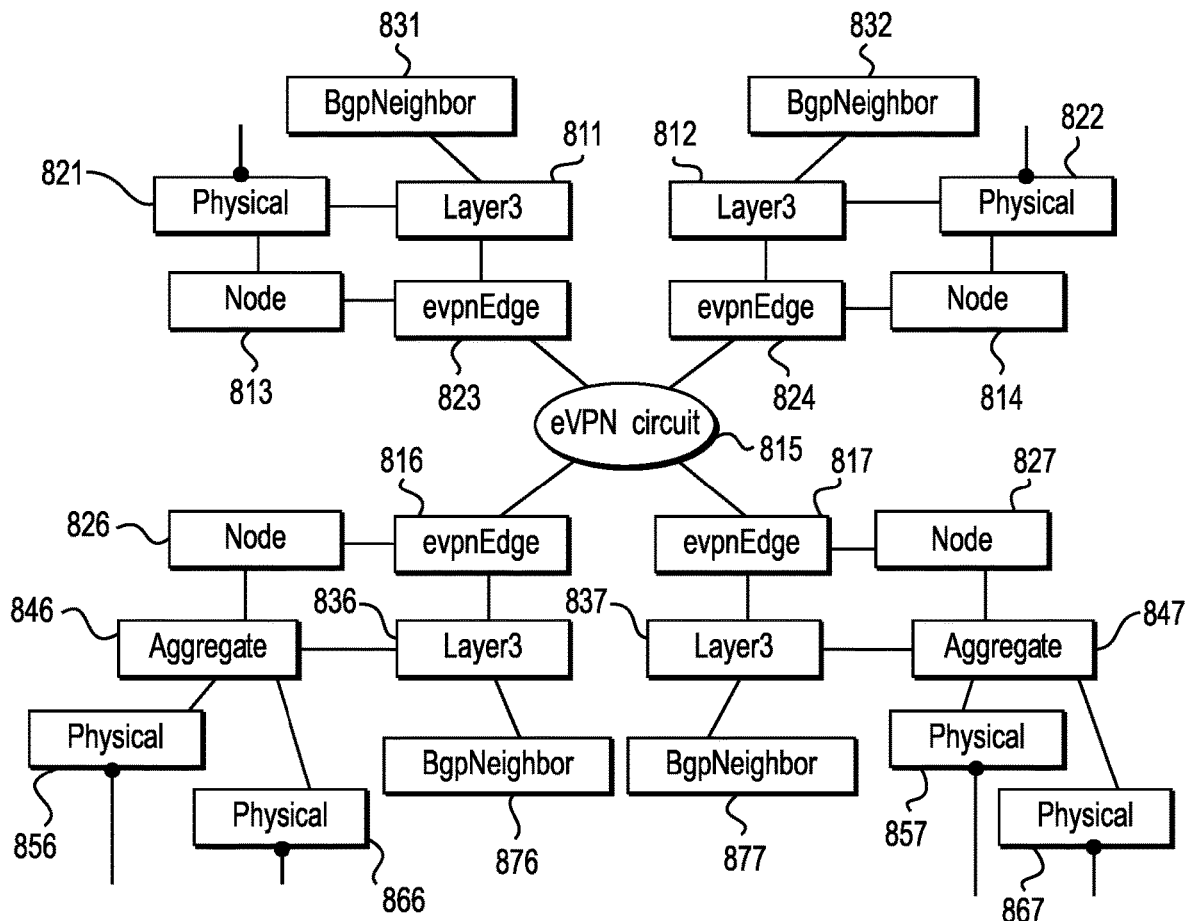
FIG. 8 illustrates the model objects and classes applied to the second exemplary customer network configuration.

Connectivity at Layer 3 level between customer network 101 and provider network 111 according to FIG. 5-7 is automatically provided by the deployment of a configuration according to FIG. 8.

Implementation of the configuration is divided into objects and classes, which each object or class being associated with an implementation action. Each of EntryNode 703 and 704 is instantiated as the association of respectively evpnEdge objects 823 and 824, with respectively Node objects 813 and 814. Each of customer connections 701 and 702 is instantiated as the association of respectively Layer 3 objects 811 and 812, with respectively Physical classes 821 and 822, and BGP Neighbor objects 831 and 832. The Mesh 604 is instantiated as evpn Circuit object 815. Each of EndNode 706 and 707 is instantiated as the association of respectively evpnEdge objects 816 and 817 with respectively Node objects 826 and 827. Connections to customer's dedicated virtual resource 708, 709 are instantiated as the association of respectively Layer 3 objects 836 and 837, Aggregate classes 846 and 847, Physical classes 856, 866, 857 and 867, and BGP Neighbor objects 876 and 877.

The hierarchy between objects is apparent, with the interface objects 821, 822, 846, 847, being hierarchically inferior to the node objects 813, 814, 826, 827, and layer objects 811, 822, 836, 837, being hierarchically inferior to the evpnEdge objects 823, 824, 816, 817.

A set of commands is used to set up the network configuration. For example, a set of calls, syntax and associated parameters is defined as the REST API which, applied to four categories of objects modelling a network configuration: Node, Interface, evpnEdge, and Layer, allows to set up a valid and secure actual configuration, then push it in the provider datacenter(s) and POP(s). The model and the REST API make it possible to address all networking configurations beyond the first and second exemplary customer network configurations above.

As regard the Node objects, the set of calls, syntax and associated parameters, is as follows:

TABLE 1

| TYPE | URL | PARAMETERS [optional] | DESCRIPTION/RESPONSE |
|---|---|---|---|
| POST | /node/{id}/interface | descr: 'Agregat'<br>bandwidth: 1000<br>switchMode: 'trunk', 'access', 'routed'<br>isMLAG: true<br>lacpMode: 'normal' | Create an aggregate interface computed:<br>PortChannelId |
| PUT | /node/{id}/interface/{id} | descr: 'eth1'<br>bandwidth: 1000<br>switchMode: 'trunk', 'access', 'routed'<br>speed: 1000 | Configure a physical interface |
| PUT | /node/{id}/interface/{id} | PortChannelId: 20 | Attach the physical interface to an aggregate |
| PUT | /node/{id}/interface/{id} | AdminState: up/down | Administrate physical interface state |

TABLE 1-continued

| TYPE | URL | PARAMETERS [optional] | DESCRIPTION/RESPONSE |
|---|---|---|---|
| PUT | /node/{id}/interface/{id} | isBlocked: true/false | Block/unblock the interface |
| DELETE | /node/{id}/interface/{id} | | Unconfigure physical interface or delete aggregate interface |
| GET | /node | [driver]<br>[nodeOrigin]<br>[nodeType]<br>[hostname]<br>[hostnamePeer]<br>[ip]<br>[ipPeer]<br>[status] | List node |
| GET | /node/{id} | | Get node details |
| GET | /node/{id}/interface | [interfaceType]<br>if interfaceType = 'phy'<br>[descr]<br>[adminStatus]<br>[interfaceName]<br>[peerNode]<br>IfinterfaceType = 'aggr'<br>[portChannelId] | Get interface list |
| GET | /node/{id}/interface/{id} | | Get interface details |

As regard the Interface objects, they are instantiated through the REST API with URL:
/nodes/{id}/interface As regard the evpn objects, the set of calls, syntax and associated parameters, is as follows:

TABLE 2

| TYPE | URL | PARAMETERS [optional] | DESCRIPTION/RESPONSE |
|---|---|---|---|
| POST | /evpn | evpnType: 'L2' or 'L3' | Create a L2 or L3 evpn<br>computed: vni<br>L3 context computed: vrf |
| POST | /evpn/{id}/evpn_edge | nodeId: nodeId<br>import_poiicy: 'open' or 'limit'<br>export_policy : 'open' or 'limit'<br>L2 context vlanId: vlanId<br>L3 context customerBgpAsn | Create an evpnNode<br>calculated: bgpComm |
| POST | /evpn/{id}/evpn_edge/{id}/layer_2 | InterfaceId: interface/{id}<br>encapMode: 'tagged', 'untagged'<br>allowedMac: 300 (100 by default) | Apply a Layer 2 on the interfaceId |
| POST | /evpn/(id}/evpn_edge/{id}/layer_3 | encapMode: 'tagged', 'untagged'<br>interfaceId: interface/{id}<br>subnet: 10.123.50.0/30'<br>Tagged context vlanid: 11 | Apply a new Layer 3 on the interfaceId |
| POST | /evpn/{id}/evpn_edge/{id}/layer_3/{id}/bgp_neighbor | bgpAsn: 65501<br>Ip: 192.168.1.4 | Add an IPV4 BGP neighbor in VRF |
| POST | /evpn/{id}/evpn_edge/{id}/layer_3/{id}/static_routes | ipRoute: 192.168.20.0/16<br>ipGateway: 192.168.1.4 | Add an IP static route |
| POST | /evpn/{id}/evpn_edge/{id}/layer_3/{id}/vrrps | ip | Add an IP VRRP<br>calculated vrrpId<br>calculated ip |
| PUT | /evpn/{id}/evpn_edge/{id}/layer_3/{id} | customerBgpAsn | Modify the customer BGP ASN |
| PUT | /evpn/{id}/evpn_edge/{id}/layer_3/{id} | ip | Modify IP on Layer 3 |
| PUT | /evpn/(id}/evpn_edge/{id}/layer_3/{id}/bgp_neighbor/{id} | enable: true/false | Enable/disable a IPV4 BGP neighbor in VRF |
| DELETE | /evpn/{id} | | Delete the evpn |
| DELETE | /evpn/{id}/evpn_edge/{id} | | Delete the evpnEdge |
| DELETE | /evpn/{id}/evpn_edge/{id}/layer_2/{id} | | Delete the Layer 2 |

TABLE 3

| TYPE | URL | PARAMETERS [optional] | DESCRIPTION/RESPONSE |
|---|---|---|---|
| DELETE | /evpn/{id}/evpn edge/{id}/layer_3/{id} | | Delete the Layer 3 |
| DELETE | /evpn/{id}/evpn_edge/{id}/layer_3/{id}/bgp_neighbor/{id} | | Delete the BGP neigbhor |
| DELETE | /evpn/{id}/evpn_edge/{id}/layer_3/{id}/static_routes/{id} | | Delete the IP static route |

TABLE 3-continued

| TYPE | URL | PARAMETERS [optional] | DESCRIPTION/RESPONSE |
|---|---|---|---|
| DELETE | /evpn/{id}/evpn_edge/{id}/layer_3/{id}/vrrps/{id} | | Delete the IP VRRP |
| GET | /evpn | [evpnType] [vni] [vrf] | List evpn |
| GET | /evpn/{id} | | Get evpn details |
| GET | /evpn/{id}/evpn_edge | [nodeId] [evpnId] | List attached evpnedge |
| GET | /evpn/{id}/evpn_edge/{id} | | Get evpnEdge details |
| GET | /evpn/{id}/evpn_edge/{id}/layer_2 | | Get the Layer 2 declared on the Edge |
| GET | /evpn/{id}/evpn_edge/{id}/layer_2/{id} | | Get Layer 2 details |
| GET | /evpn/{id}/evpn_edge/{id}/layer_3 | [encapMode] [subnet] [vlanId] [interfaceId] | Get the Layer 3 declared on the Edge |
| GET | /evpn/{id}/evpn_edge/{id}/layer_3/{id} | | Get Layer 3 details |

As regard the Layer objects, they are instantiated through the REST API with URLs:

/evpn/{id}/evpn_edge/{id}/layer_3, or

/evpn/{id}/evpn_edge/{id}/layer_2 depending on the context of the customer configuration.

Aggregate and Physical classes are not visible in the above described REST API, but are still used and instantiated internally as the case may be, through a parameter in:

/node/{id}/interface of a POST call in Table 1.

We will now show for the first exemplary customer network configuration, how the REST API according to the present technology allows to efficiently deploy the configuration into a provider datacenter(s) and POP(s).

Figure 9:
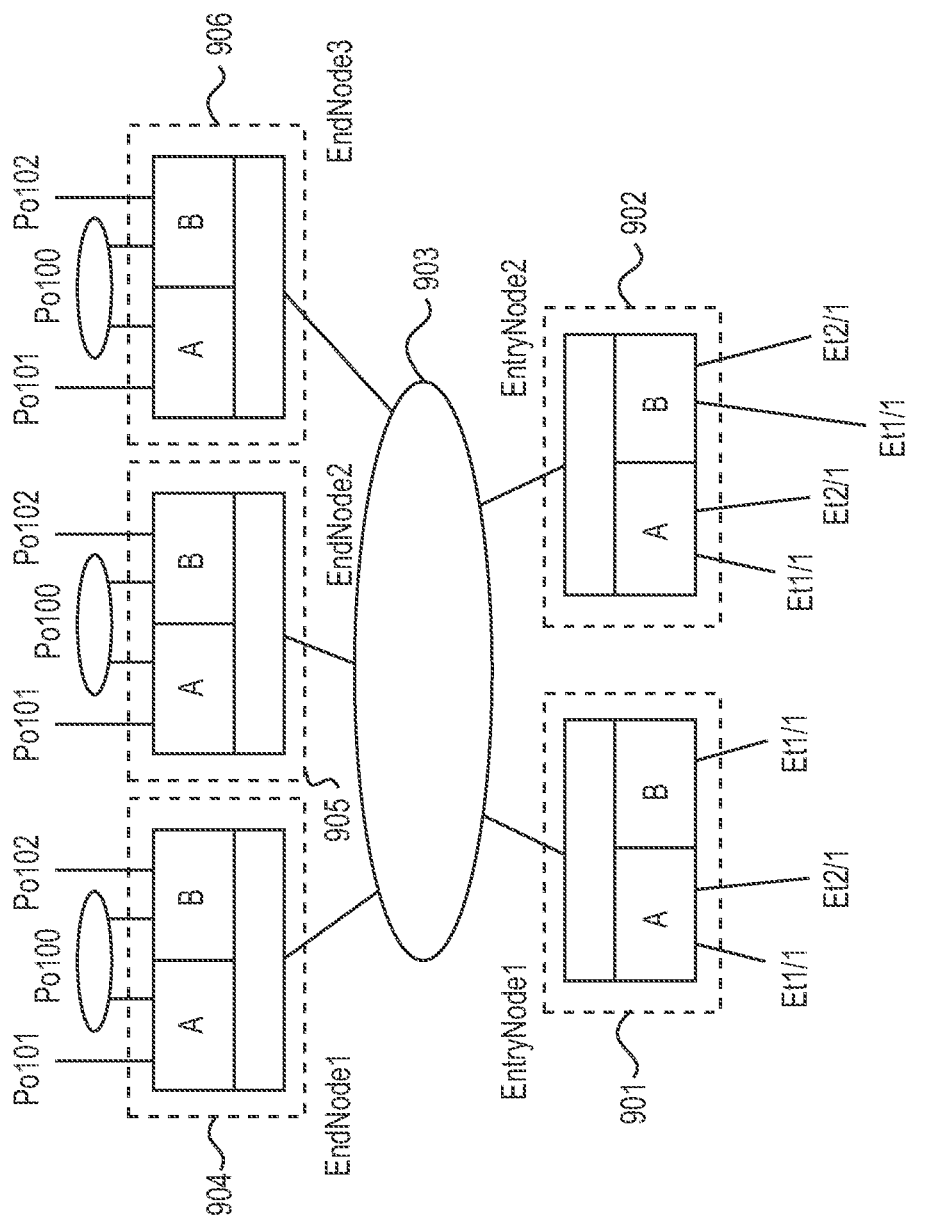
FIG. 9 illustrates the generic resources available in a provider datacenter(s) and point(s) of presence.

The provider datacenter(s) and POP(s) are assumed to have the generic switch fabric and resources as described in relation to FIG. 9. EntryNode1 901 and EntryNode2 902 each have two switches A and B. Each switch A or B has a number of EtherChannels as inputs, in this case, and merely as an example, switch B of EntryNode1 has only one input Et1/1, while all other switches have two inputs Et1/1 and Et2/1. EntryNode1 901 and EntryNode2 902 represent two POPs for the provider infrastructure. Both EntryNode1 901 and EntryNode2 902 are connected to a provider backbone 903. To the same backbone 903 are connected EndNode1 904, EndNode2 905 and EndNode3 906. Each of these EndNodes has two switches A and B. Each switch A or B has provisioned a number of PortChannels as outputs, in this case, and merely as an example, respectively PortChannels Po101 and Po102 for Layer 3 connectivity, and a PortChannel Po100 common between switch A and switch B for Layer 2 connectivity. The choices made herein for generic resources are arbitrary, even if incidentally they provide a redundancy improving the robustness of the network. It will be apparent to the person skilled in the art that the generic switch fabric and resources as described in relation to FIG. 9 are provided merely as an example of implementation, and that the present technology could operate in other generic environments. For example:

EntryNodes and EndNodes, or certain of them, could feature a different number of switches: 1, or more than 2;

there could be any number of EntryNodes and EndNodes; etc.

The exemplary parameter values are assumed to be had in the right hand side column of Table 4, as follows:

TABLE 4

| | Value |
|---|---|
| EntryNode 1 (nodeId) | 4 |
| EntryNode 2 (nodeId) | 5 |
| BGP Area | 65100 |
| endNode A (nodeId) | 1 |
| Po100 (Id) | 20 |
| Po101 (Id) | 21 |
| Po102 (Id) | 22 |
| endNode B (nodeId) | 2 |
| Po100 (Id) | 23 |
| Po101 (Id) | 24 |
| Po102 (Id) | 25 |
| endNode C (nodeId) | 3 |
| Po100 (Id) | 26 |
| Po101 (Id) | 27 |
| Po102 (Id) | 28 |

Figure 10A:
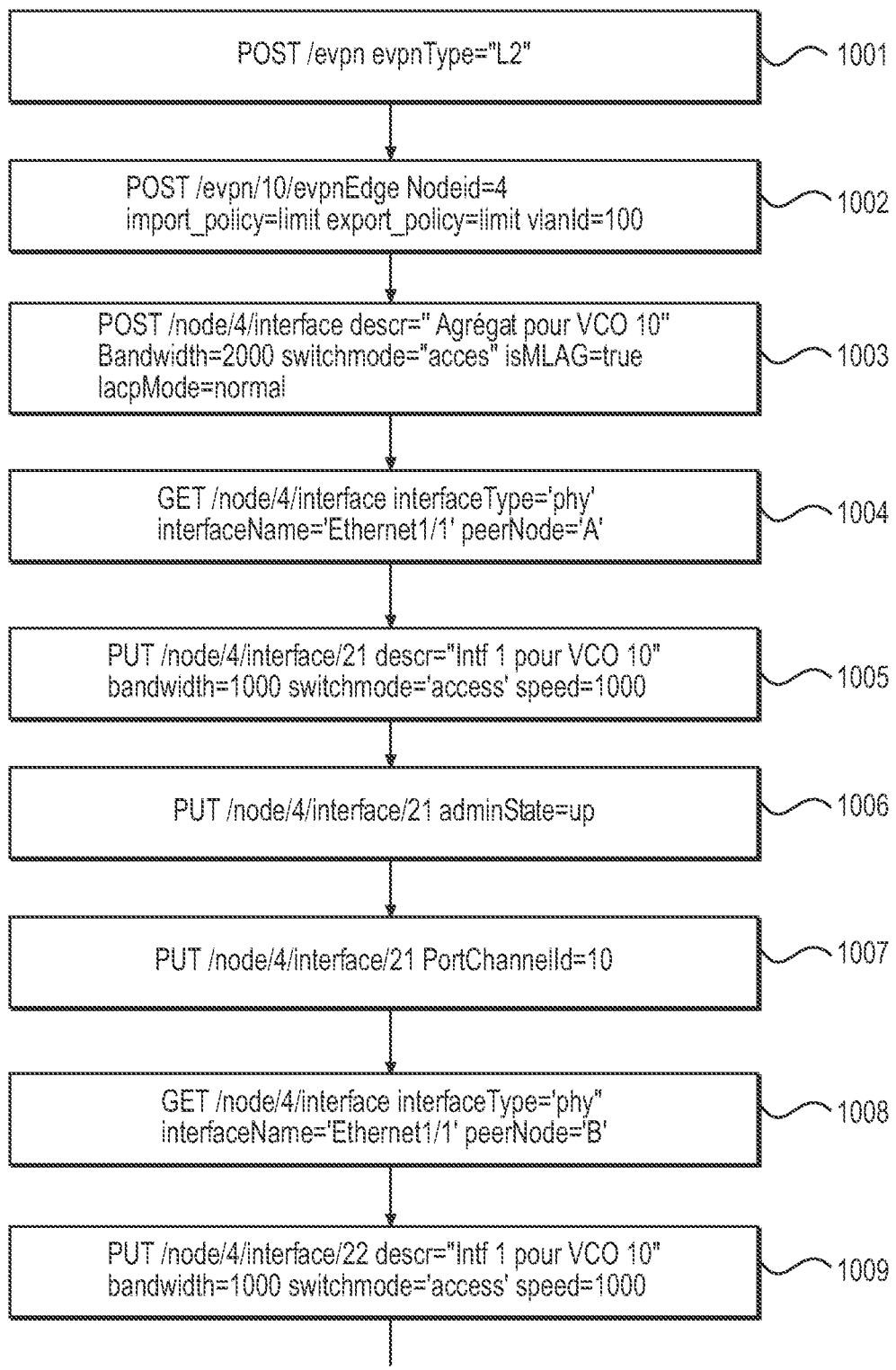
FIGS. 10-A and 10.B describe a process for implementing the first exemplary customer network configuration in the provider datacenter(s) and point(s) of presence.
Figure 10B:
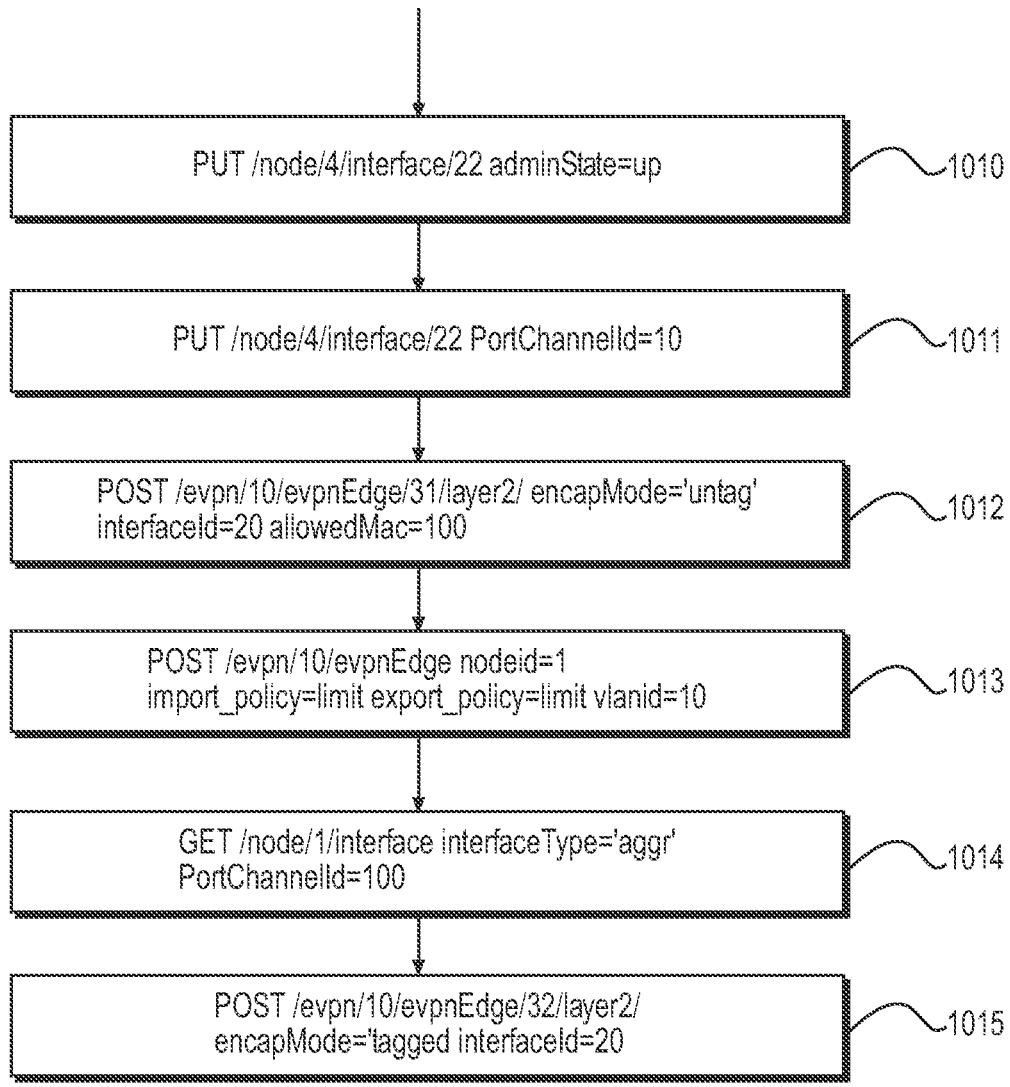

FIGS. 10-A and 10.B describe a process for implementing the first exemplary customer network configuration in the provider datacenter(s) and POP(s). At step 1001, an evpn object is created of the type Layer 2. At step 1002, a POP is created at EntryNode1 with a vlanId=100. At step 1003, a Multi-chassis Link Aggregation (MLAG) is created. A step 1004, access to the physical interface on switch A of EntryNode1 and more particularly EtherChannel 1/1, is obtained. At step 1005, the physical interface on switch A is configured. At step 1006, the physical interface on switch A is activated.

At step 1007, the physical interface on switch A is attached to the MLAG. At step 1008, access to the physical interface on switch B of EntryNode1 and more particularly EtherChannel 1/1, is obtained. At step 1009, the physical interface on switch B is configured. At step 1010, the physical interface on switch B is activated. At step 1011, the physical interface on switch B is attached to the MLAG. At step 1012, the vlan is associated to the PortChannel Po100. At step 1013, endNode1 is created. At step 1014, access to the PortChannel Po100 is obtained. At step 1015, Vlan is associated to PortChannel Po100.

Figure 11:
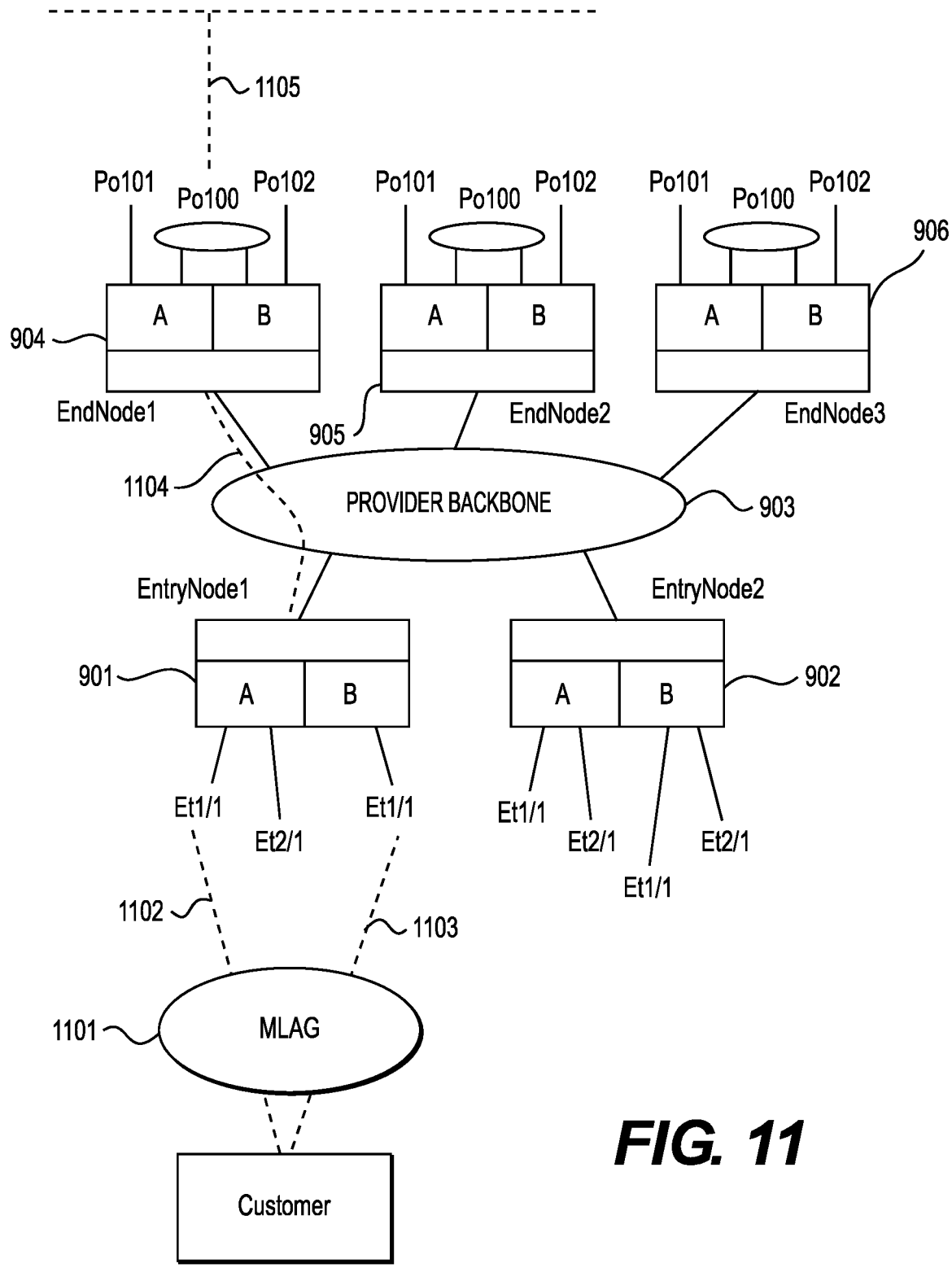
FIG. 11 illustrates the effect of the process of FIG. 10-A-B applied to the generic resources available in the provider datacenter(s) and point(s) of presence.
Figure 12A:
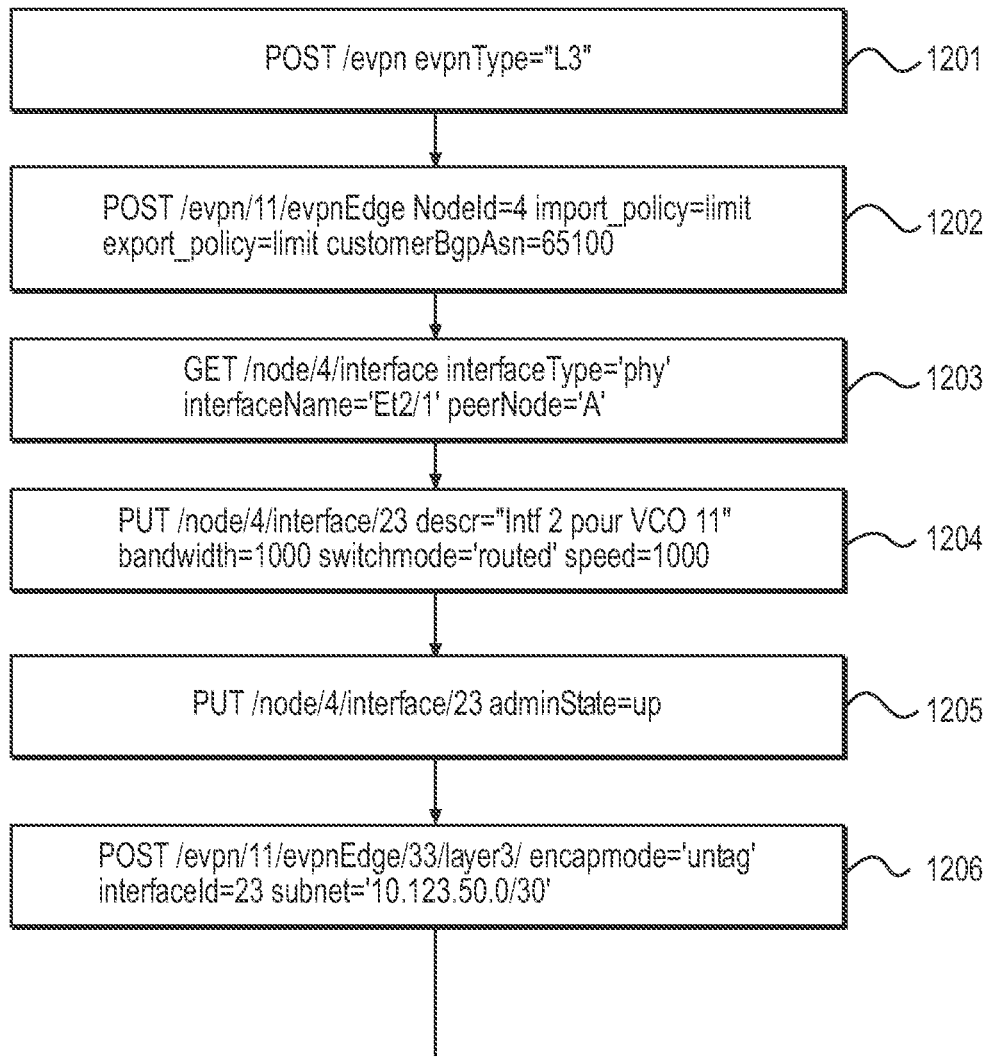
FIG. 12-A to 12-D describe a process for implementing the second exemplary customer network configuration in the provider datacenter(s) and point(s) of presence.
Figure 12B:
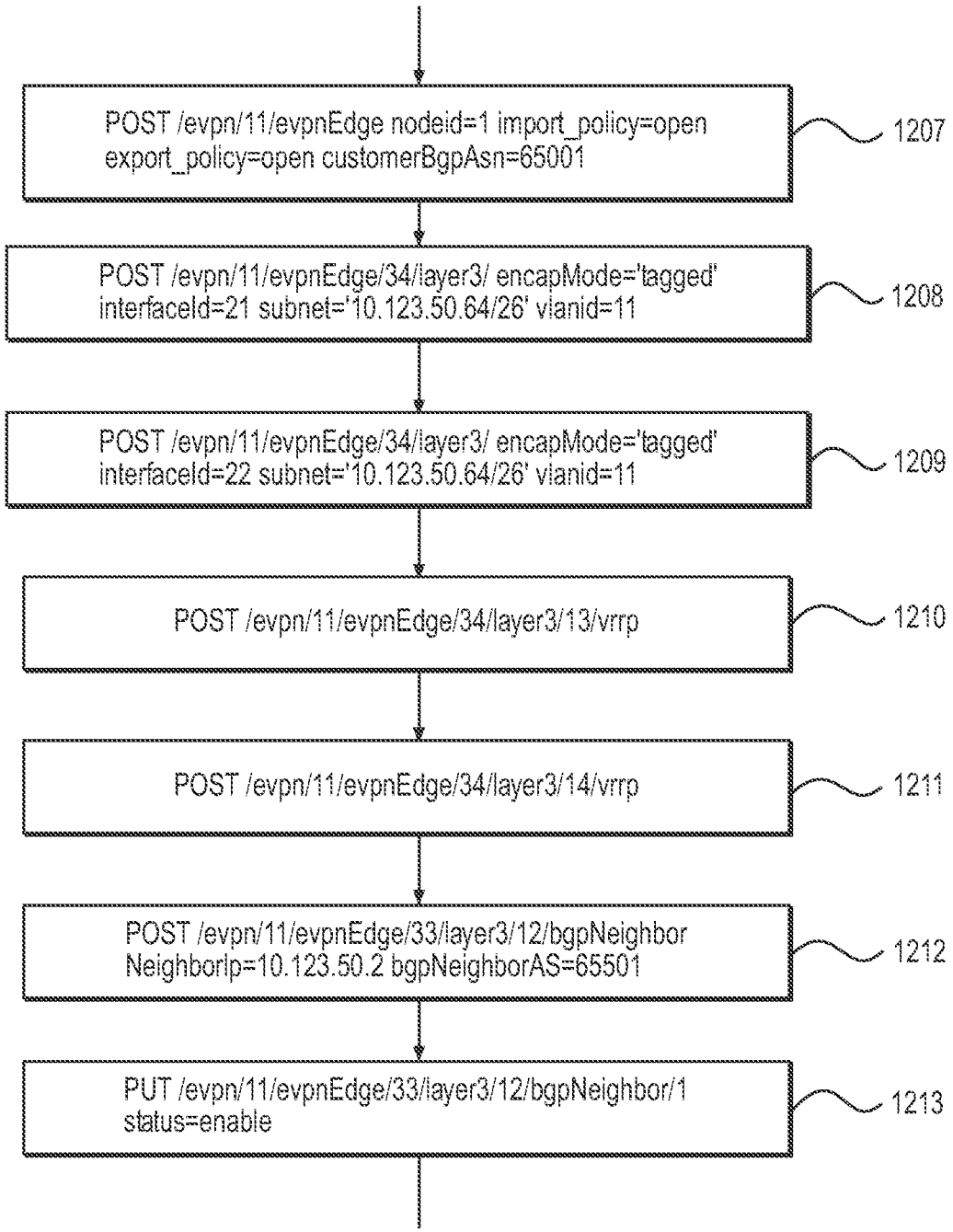
Figure 12C:
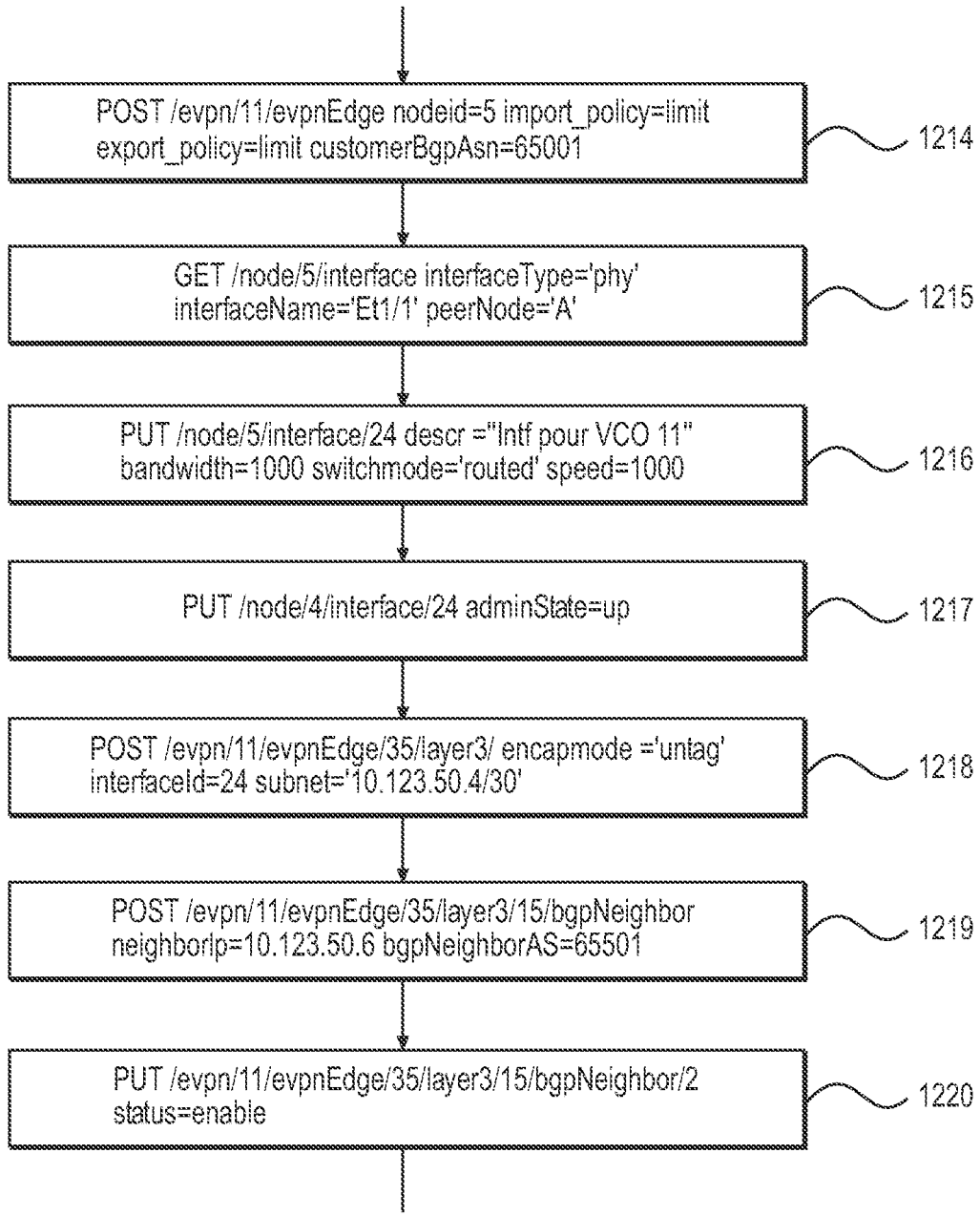
Figure 12D:
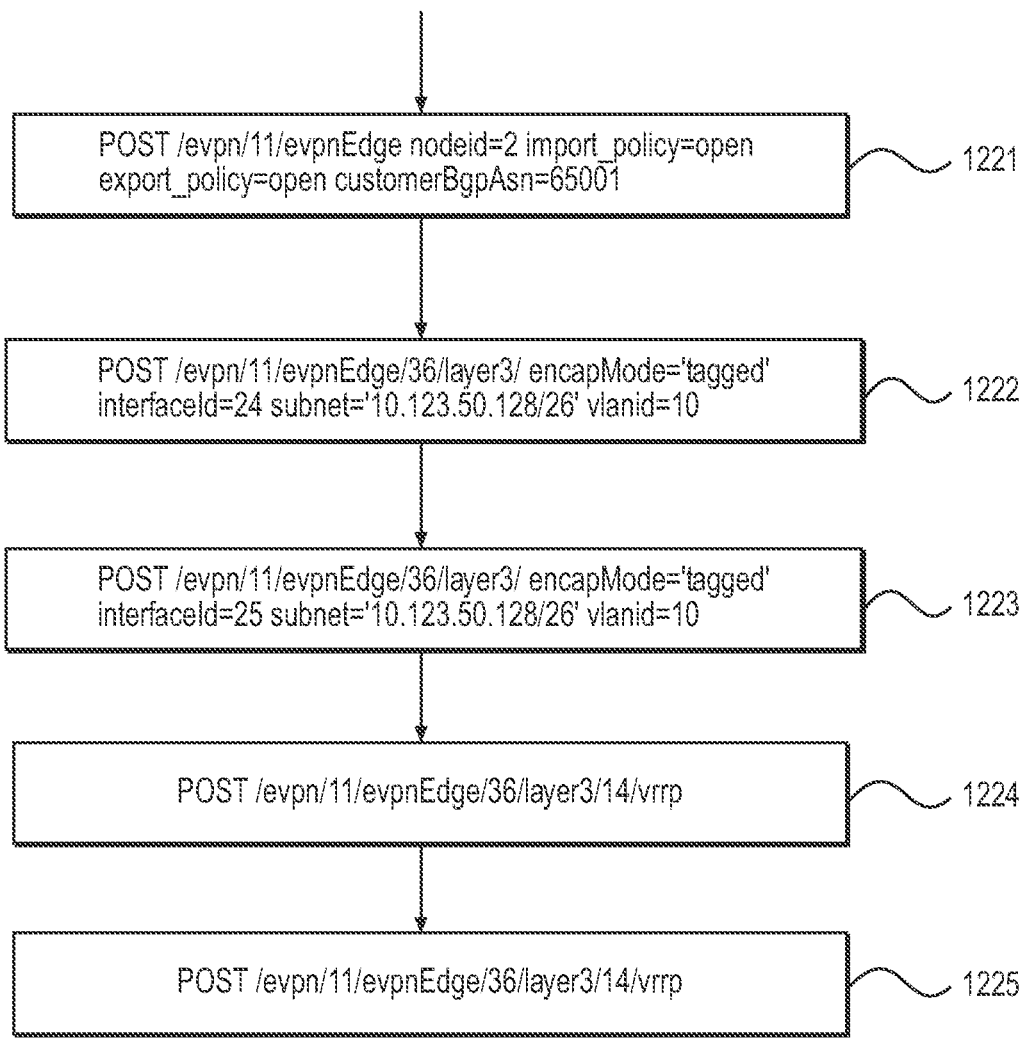

The effect of applying the foregoing process on the generic switch fabric resources of the provider datacenter(s) and POP(s) is to set up the first exemplary customer network configuration, according to FIG. 11. Cross-reference is made between the physical elements of FIG. 11 and the process steps of FIG. 10A-B: MLAG 1101 has been set up at step 1003. 1102 and 1103 are connections to the EtherChannels respectively Et1/1 of switch A of EntryNode1 901, and Et1/1 of switch B of EntryNode1 901. These connections have been set up respectively at steps 1004 and 1008. Connection 1104 has been set up between EntryNode1 901 and provider backbone 903 at step 1002, and between provider backbone 903 and EndNode1 904 at step 1013. Connection 1105 has been set up at step 1015.

We will now show for the second exemplary customer network configuration, how the REST API according to the present technology allows to efficiently deploy the configuration in the provider datacenter(s) and point(s) of presence. The provider datacenter(s) and POP(s) are assumed to have the generic switch fabric and resources as described in relation to FIG. 9, together with the parameter values of Table 4.

FIG. 12-A to 12-D describe a process for implementing the second exemplary customer network configuration in the provider datacenter(s) and POP(s). At step 1201, an evpn object is created of the type Layer 3. At step 1202, a POP is created at EntryNode1 in a BGP area 65100, and Virtual Routing and Forwarding (VRF) configured on EntryNode1. A step 1203, access to the physical interface on switch A of EntryNode1 and more particularly EtherChannel 2/1, is obtained. At step 1204, the physical interface (Et 2/1) on switch A is configured for routed mode. At step 1205, physical interface on switch A is activated. At step 1206, an IP address is set up on EtherChannel 2/1. At step 1207, VRF is configured on EndNode1. At step 1208, an IP address is configured on PortChannel Po101 of EndNode1. At step 1209, an IP address is configured on PortChannel Po102 of EndNode1. At step 1210, Virtual Router Redundancy Protocol (VRRP) protocol is configured on switch A of EndNode1. At step 1211, VRRP protocol is configured on switch B of EndNode1. At step 1212, a BGP neighbor is configured. At step 1213, the BGP neighbor is activated.

Figure 13:
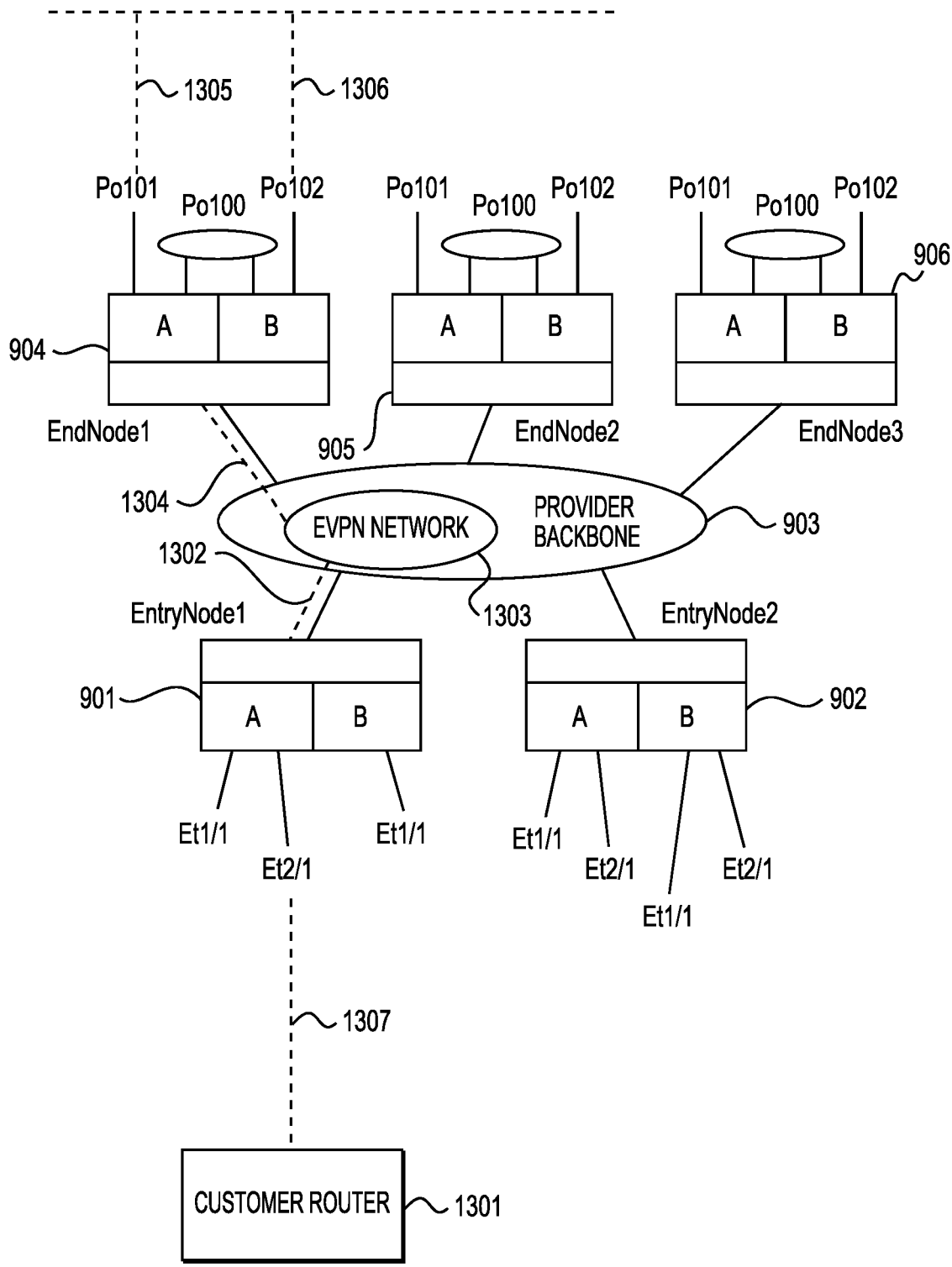
FIG. 13 illustrates the effect of the process of FIG. 12-A-D applied to the generic resources available in the provider datacenter(s) and point(s) of presence.

The effect of applying the foregoing process on the generic switch fabric resources of the provider datacenter(s) and POP(s) is to set up a configuration as shown FIG. 13, after at step 1213, a Layer 3 virtual connection is implemented. Cross-reference is made between the physical elements of FIG. 13 and the process steps of FIG. 12A-D: a customer router 1301 is connected via connection 1307 to EtherChannel 2/1 of switch A of EntryNode1 901. This is done in BGP domain 65501. The route 1302, 1304 through evpn network 1303 in BGP domain 65001 has been set up, from EntryNode1 to EndNode1. Connections 1305 and 1306 have been set up at steps 1208 and 1209.

Starting from step 1214 on FIG. 12-C, the process allows to extend the previous Layer 3 virtual connection to a second POP. At step 1214, a second POP is created at EntryNode2 in a BGP area 65100, and VRF configured on EntryNode2. At step 1215, access to the physical interface on switch A of EntryNode2 902 and more particularly EtherChannel 1/1, is obtained. At step 1216, the physical interface (Et1/1) on switch A is configured for routed mode. At step 1217, the physical interface (Et1/1) on switch A is activated. At step 1218, an IP address is set up on EtherChannel 1/1. At step 1219, a BGP neighbor is configured. At step 1220, the BGP neighbor is activated.

Figure 14:
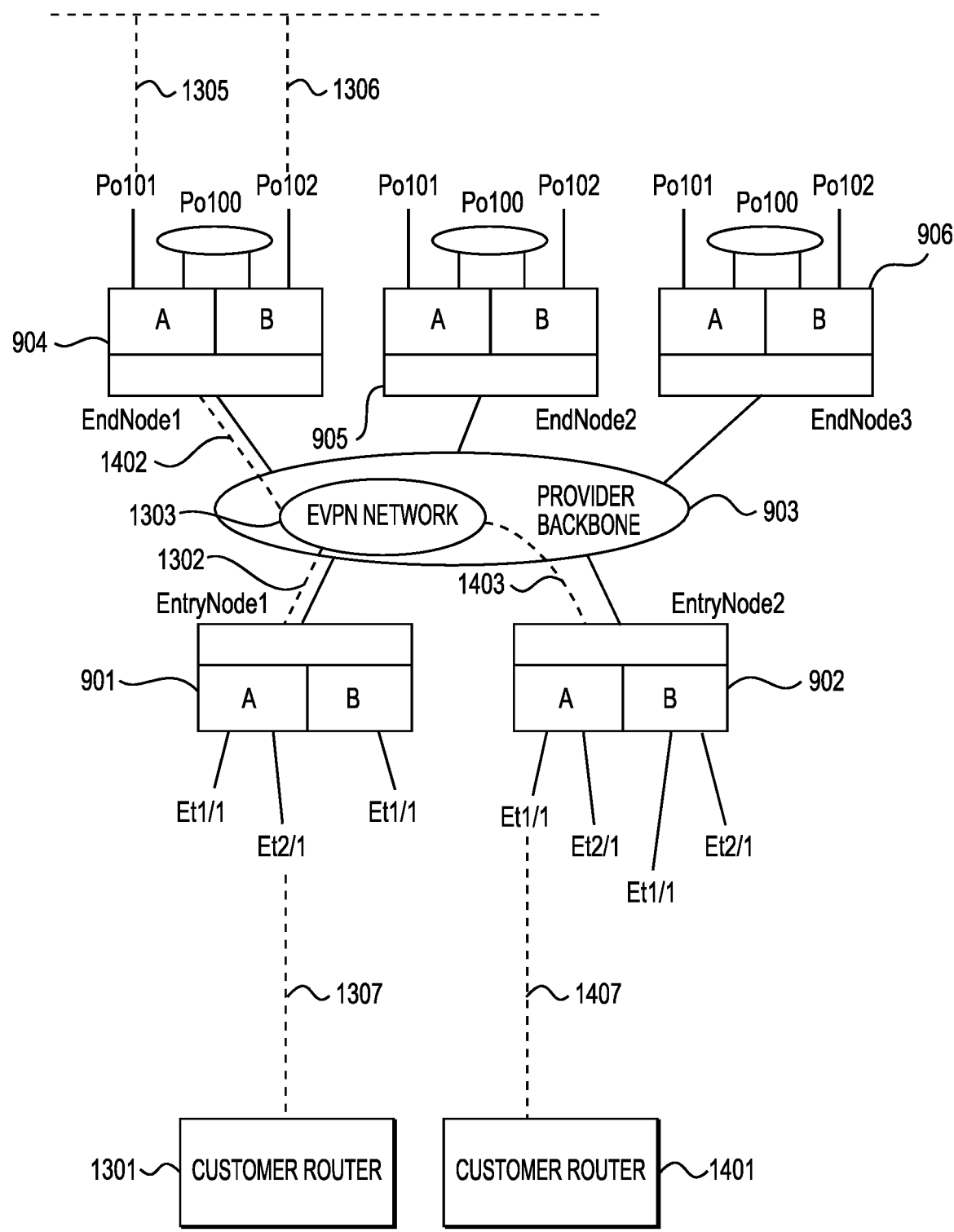
FIG. 14 illustrates the effect of the process of FIG. 12-C applied to the generic resources available in the provider datacenter(s) and point(s) of presence.

The effect of applying the foregoing process on the generic switch fabric resources of the provider datacenter(s) and POP(s) is to set up a configuration as shown FIG. 14, after at step 1220, a Layer 3 virtual connection is extended to a second POP. Cross-reference is made between the physical elements of FIG. 14 and the process steps of FIG. 12-C: a customer router 1401 is connected via connection 1407 to EtherChannel 1/1 of switch A of EntryNode1 902. This is done in BGP domain 65501. The route 1403, 1402 through evpn network 1303 in BGP domain 65001 has been set up, from EntryNode2 to EndNode1.

Starting from step 1221 on FIG. 12-D, the process allows to extend the previous Layer 3 virtual connection to a second datacenter. At step 1221, VRF is configured on EndNode2. At step 1222, an IP address is configured on PortChannel Po101 of EndNode2. At step 1223, an IP address is configured on PortChannel Po102 of EndNode2. At step 1224, VRRP protocol is configured on switch A of EndNode2. At step 1225, VRRP protocol is configured on switch B of EndNode2.

Figure 15:
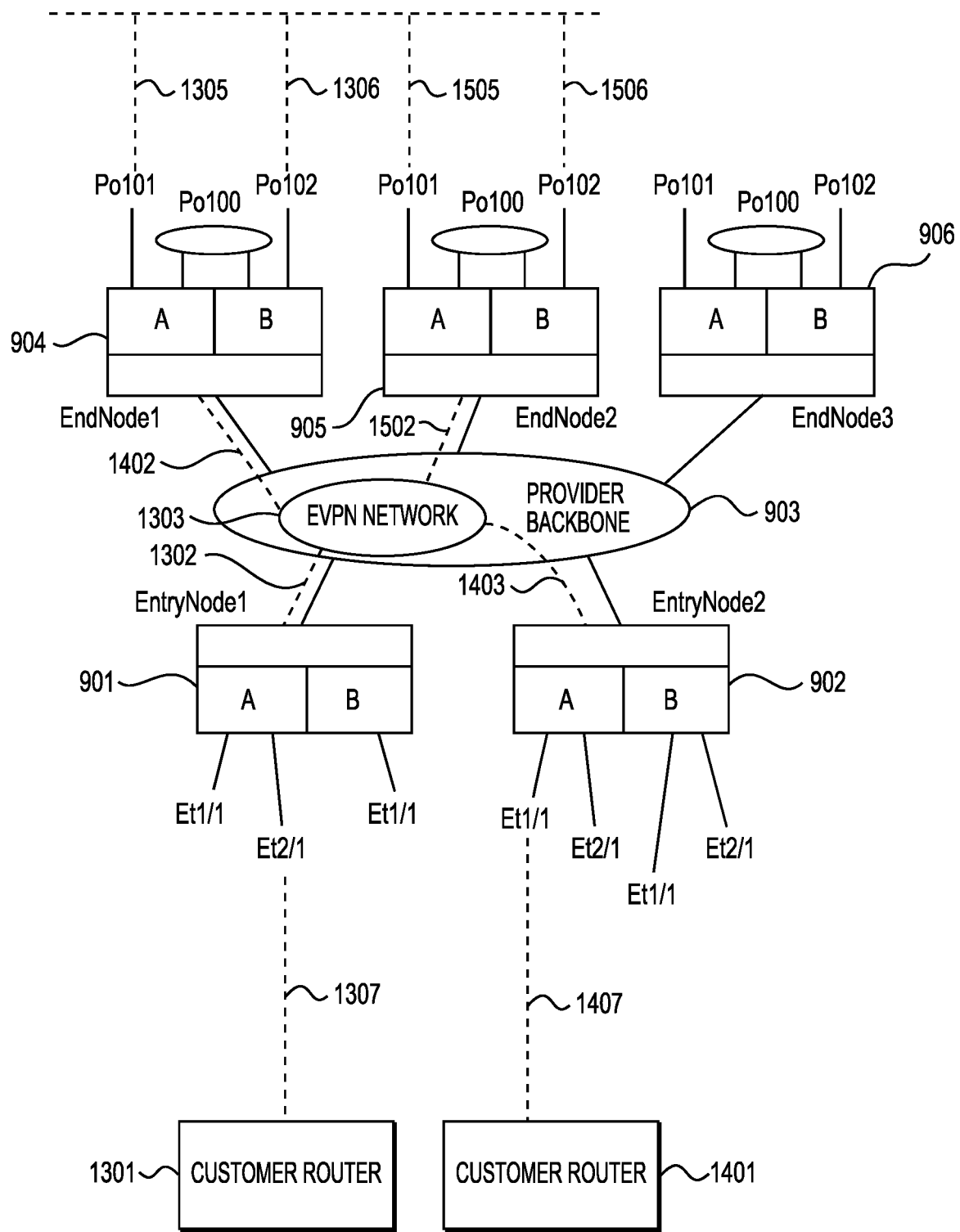
FIG. 15 illustrates the effect of the process of FIG. 12-D applied to the generic resources available in the provider datacenter(s) and point(s) of presence.

The effect of applying the foregoing process on the generic switch fabric resources of the provider datacenter(s) and POP(s) is to set up a configuration as shown FIG. 15, after at step 1225, a Layer 3 virtual connection is extended to a second datacenter. Cross-reference is made between the physical elements of FIG. 15 and the process steps of FIG. 12-D: connections 1505 and 1506 have been set up at steps 1222 and 1223.

The process according to the present technology allows to ensure only valid and secure customer configurations are pushed to the provider datacenter(s) and POP(s). Indeed, the object modelling for the configuration, as well as the set of calls, syntax and associated parameters in the REST API, result in breaking down the configuration into a sequence of calls on objects, with each object being valid because its parents in hierarchy are also valid.

For example, to create a Layer 3 object, the call is:
POST /evpn/<id>/evpnEdge/<id>/layer3
However, for this call to not return in error, both evpn et evpnEdge objects are instantiated before the call.
First, evpn would have to be instantiated through the call:
POST /evpn
Then, evpnEdge:
POST /evpn/<id>/evpnEdge
Finally the above call POST /evpn/<id>/evpnEdge/<id>/layer3 would allow a Layer 3 object to be instantiated.

In the same token, a DELETE call applied on an evpnEdge object may not succeed if not preceded by a DELETE call applied on a Layer 3 object.

Incomplete and temporary configurations may thus be pushed to the provider datacenter(s) and POP(s), but not configurations that are not valid or not secure.

The process according to the present technology further allows multi-tenancy in the provider datacenter(s) and POP(s). Indeed, each network configuration pushed to the datacenter(s) and POP(s) is fully independent of other network configurations, for example for other customers.

While the present technology has been described in relation to Virtual Extensible LAN (Vxlan) protocol, it will be apparent to the person skilled in the art that the teachings herein equally apply to other protocols, such as the Multi-protocol Label Switching (MPLS) protocol.

While the present technology has been described in relation to a number of POPs and of datacenters, it will be apparent to the person skilled in the art that the teachings herein equally apply to any number of POPs and datacenters, and of combinations thereof: for example one POP and two datacenters, or two POPs and one datacenter.

While the present technology has been described in relation to Layer 2 and/or 3 protocols from one evpnEdge to the other, it will be apparent to the person skilled in the art that the teachings herein equally apply to other and even future protocols such as Layer 3v6: a child Layer class may be added for the deployment method to apply in the context of other protocols without other changes to the method involved.

Figure 16:
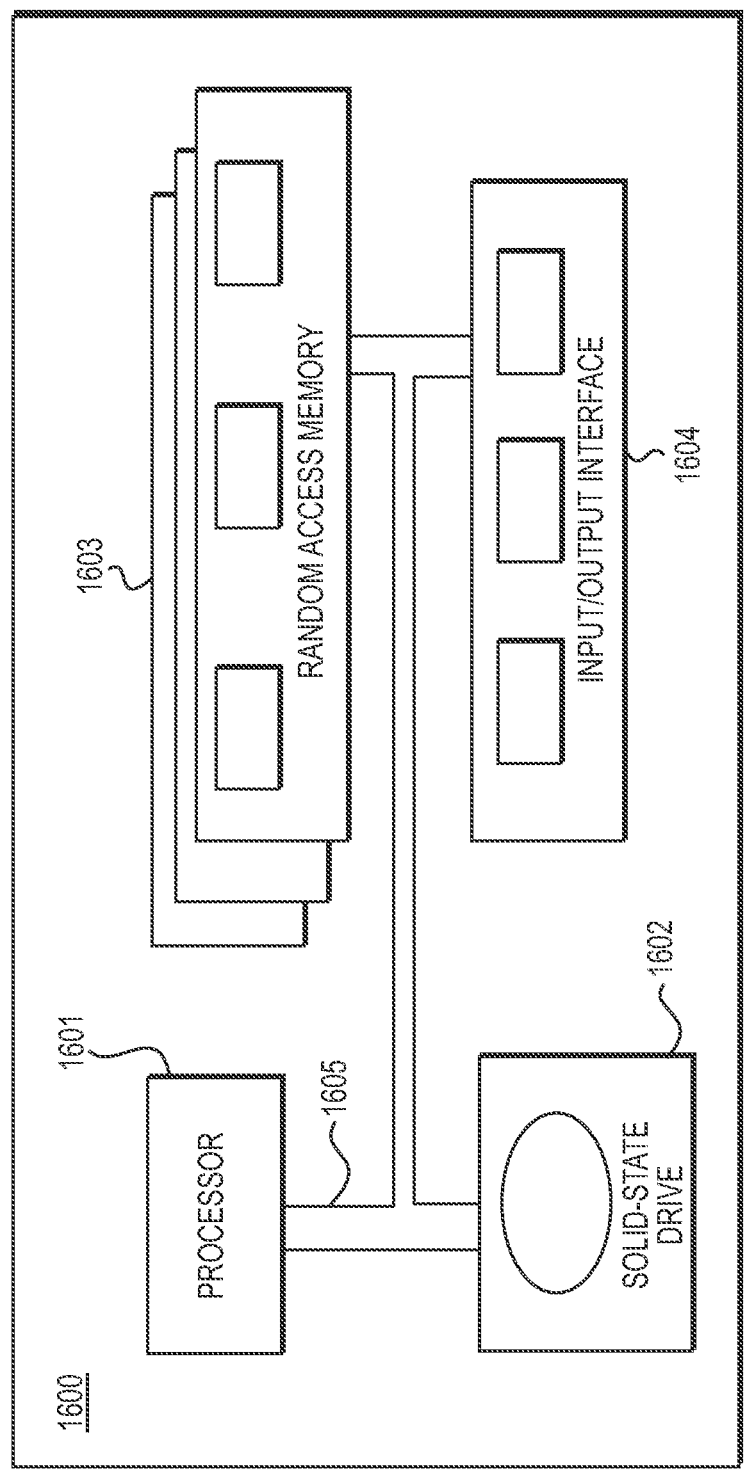
FIG. 16 illustrates an example of a computing device that may be used to implement any of the methods described herein.

FIG. 16 illustrates an example of a computing device that may be used to implement any of the methods described herein. 1600 represents a computing environment in accordance with an embodiment of the present technology is shown. In some embodiments, the computing environment 1600 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 1600 comprises various hardware components including one or more single or multi-core processors collectively represented by a processor 1601, a solid-state drive 1602, a random access memory 1603 and an input/output interface 1604.

In some embodiments, the computing environment 1600 may also be a sub-system of one of the above-listed systems. In some other embodiments, the computing environment 1600 may be an "off the shelf" generic computer system. In some embodiments, the computing environment 1600 may also be distributed amongst multiple systems. The computing environment 1600 may also be specifically dedicated to the implementation of the present technology. As a person in the art of the present technology may appreciate, multiple variations as to how the computing environment 1600 is implemented may be envisioned without departing from the scope of the present technology.

Communication between the various components of the computing environment 1600 may be enabled by one or more internal and/or external buses 1605 (e.g. a PCI bus, universal serial bus, IEEE 1394 "Firewire" bus, SCSI bus, Serial-ATA bus, ARINC bus, etc.), to which the various hardware components are electronically coupled.

The input/output interface 1604 may allow enabling networking capabilities such as wire or wireless access. As an example, the input/output interface 1604 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP). According to implementations of the present technology, the solid-state drive 1602 is a non-transitory computer-readable medium that stores machine executable instructions suitable for being loaded into the random access memory 1603 and executed by the processor 1601 for executing operating data centers based on a generated machine learning pipeline. For example, the program instructions may be part of a library or an application.

What is claimed is:

1. A method of deploying a network configuration in a datacenter, the network configuration including one of more points of interconnection, a point of presence of the datacenter being one of the one or more points of interconnection, the method comprising the steps of:
    modelling each of the one or more points of interconnection in the network configuration through objects, the objects for a given point of interconnection comprising:
        a node object representing the given point of interconnection,
        an interface object being hierarchically inferior to the node object and representing a connection to the given point of interconnection,
        an evpnEdge object representing the transport to/from of the given point of interconnection in the network, and
        a layer object being hierarchically inferior to the evpnEdge object, and representing characteristics of a protocol of transport to/from the given point of interconnection;
    setting up the network configuration by a succession of commands on the objects; and
    pushing the set up network configuration to the datacenter.

2. The method of claim 1, wherein the commands on the objects are REST API calls applied on the objects.

3. The method of claim 1, wherein the pushing step is performed after a number of commands that is less than the total number of commands involved in the succession of commands on the objects.

4. The method of claim 1, wherein the layer object is adapted for a Layer 2 protocol to be the protocol of transport.

5. The method of claim 1, wherein the layer object is adapted for a Layer 3 protocol to be the protocol of transport.

6. The method of claim 1, wherein the protocol of transport is VxLAN.

7. The method of claim 1, wherein the protocol of transport is MPLS.

8. A computer-implemented system configured to perform the method of claim 1.

9. A non-transitory computer-readable medium having stored thereon machine executable instructions for performing, when executed by a processor, the method of claim 1.

* * * * *